US009939630B2

(12) United States Patent
Burger et al.

(10) Patent No.: US 9,939,630 B2
(45) Date of Patent: Apr. 10, 2018

(54) NON-AQUEOUS CONDUCTIVE LIQUIDS FOR LIQUID LENSES (71) Applicant: PARROT SA, Paris (FR)

(72) Inventors: Benjamin Burger, Lyons (FR);
Stéphanie Chevalliot, Lyons (FR);
Géraldine Malet, Villeurbanne (FR)

(73) Assignee: PARROT DRONES, Paris (FR)

( * ) Notice: Subject to any disclaimer, the term of this patent is extended or adjusted under 35 U.S.C. 154(b) by 78 days.

(21) Appl. No.: 14/717,042

(22) Filed: May 20, 2015

(65) Prior Publication Data

US 2015/0338637 A1 Nov. 26, 2015

Related U.S. Application Data (60) Provisional application No. 62/000,820, filed on May 20, 2014.

(51) Int. Cl.
G02B 26/00 (2006.01)
G02B 26/08 (2006.01)
(Continued)

(52) U.S. Cl.
CPC ............ *G02B 26/005* (2013.01); *G02B 1/06* (2013.01); *G02B 3/12* (2013.01); *G02B 3/14* (2013.01); *Y10T 29/49002* (2015.01)

(58) Field of Classification Search
USPC ................. 359/237, 24, 251–254, 265–267, 359/270–273, 315, 321, 290–292, 295,
(Continued)

(56) References Cited

U.S. PATENT DOCUMENTS

| | | | |
|---|---|---|---|
| 2007/0015675 A1* | 1/2007 | Painter | C11D 3/43 510/276 |
| 2007/0040982 A1* | 2/2007 | Nakano | G02B 26/005 349/149 |
| 2012/0092753 A1* | 4/2012 | Heikenfeld | G02B 26/005 359/296 |

FOREIGN PATENT DOCUMENTS

| | | |
|---|---|---|
| EP | 1166157 A1 | 1/2002 |
| EP | 1 816 491 A1 | 8/2007 |

(Continued)

OTHER PUBLICATIONS

B. Raj et al.; "Ion and Liquid Dependent Dielectric Failure in Electrowetting Systems"; Langmuir, vol. 25, pp. 12387-12392; Aug. 13, 2009 (6 pages).

(Continued)

*Primary Examiner* — Brandi Thomas
(74) *Attorney, Agent, or Firm* — Osha Liang LLP (57) ABSTRACT An electrowetting optical device having a non-aqueous conductive liquid and a non-conductive liquid, the liquids being non-miscible, and a dielectric enclosure on which both liquids are in contact and form a triple interface. The non-aqueous conductive liquid includes a non-ionic polar organic solvent, and at least 2 weight % of a first compound, where the first compound is non-aqueous and is either ionic or non-ionic. If the first compound is non-ionic, the first compound is more polar than the solvent, the polarity of the non-ionic first compound being measured by Hansen parameters, a sum of the Hansen parameter for polarity ($\delta_p$) and of the Hansen parameter for hydrogen bonding ($\delta_h$) being higher than the sum of the corresponding Hansen parameters of the non-ionic polar organic solvent, and the non-aqueous conductive liquid having an ionic second compound.

14 Claims, 1 Drawing Sheet (51) Int. Cl.
*G02F 1/29* (2006.01)
*G02B 3/12* (2006.01)
*G02B 1/06* (2006.01)
*G02B 3/14* (2006.01)

(58) Field of Classification Search
USPC .................................................. 359/296, 298
See application file for complete search history.

(56) References Cited

FOREIGN PATENT DOCUMENTS

| WO | 00/58763 A1 | 10/2000 |
| WO | 2004/099845 A1 | 11/2004 |
| WO | 2008/110560 A1 | 9/2008 |

OTHER PUBLICATIONS

S. Chevalliot et al.; "Analysis of Nonaqueous Electrowetting Fluids for Displays"; Journal of Display Technology, vol. 7, No. 12, pp. 649-656; Dec. 2011 (8 pages).

X. Hu et al.; "Electrowetting based infrared lens using ionic liquids"; Applied Physics Letters, 99, 213505; Nov. 22, 2011 (4 pages).

\* cited by examiner

NON-AQUEOUS CONDUCTIVE LIQUIDS FOR LIQUID LENSES

TECHNICAL FIELD

The present disclosure relates to electrowetting optical devices as well as the process of manufacture and the applications thereof. The present disclosure also relates to liquid lenses comprising said electrowetting optical devices and apparatuses comprising said liquid lenses.

BACKGROUND

Electrowetting based liquid lenses are well known and several patents cover their general description and applications such as, for example, EP 1 816 491 A1 and EP 1 166 157 A1. The electrowetting based liquid lenses described in these patent applications, as in all current commercial applications, are based on the formulation of two phases, namely an oil and a conductive phase, the latter being water based, the conductive phase generally comprising 50 weight percent or more of water and 50 weight percent or less of organic polar components such as glycols. In addition, the two phases are generally non-miscible, and form a triple interface on an isolating substrate comprising a dielectric material, such as parylene C.

Water is generally used as the main component of the conductive phase because water provides a highly polar component in said conductive phase. Indeed, according to the Young relation, $\gamma_{conductive\ phase/dielectric} = \gamma_{oil/dielectric} + \cos\theta \gamma_{oil/conductive\ phase}$, wherein $\gamma_{i/j}$ is the surface energy between a phase i and a phase j, the wetting of the oil on the dielectric surface is favored when the conductive phase has the highest polarity. Furthermore, the use of water in the conductive phase minimizes the cross-solubility between oil and conductive phase, even at high temperature, which may result in acceptable electrowetting performances.

However, among the drawbacks of water based conductive phases are the volatility of water, particularly when the electrowetting device is used in warm or hot environment, risks of corrosion of the electrowetting device by the conductive phase, which is generally saline, and the tendency of water to degrade the electrowetting device, and thus any liquid lens or apparatus or package comprising such electrowetting device. Especially, for liquid lens applications, the use of water leads to slow evaporation of water over time and leakage of water outside the liquid lens. In addition, when too much water is lost, an air bubble will appear in the liquid lens, which renders said lens ineffective. For example, the liquid lenses described in EP 1 816 491 A1 present failures due to air bubble apparition in the water-based conductive phase after long-term storage at high temperature. Another drawback of water-based conductive phases, in industrial applications, is the requirement of having a water-based conductive phase having a freezing point below −20° C., which is difficult to be achieved without impairing other properties of the water-based conductive phase.

There are in the patent literature other general descriptions of conductive phases, which may be used in electrowetting devices (see, for example WO 2004/099845 A1). However, to the best of our knowledge, all patent literature discloses water-based conductive phases.

Nevertheless, the academic literature provides some exemplary non-aqueous formulations for electrowetting devices. For example, Heikenfeld et al. describe non-aqueous conductive phases for electrowetting applications (see J. disp. Technol. 2011, 7, 649-656; Langmuir 2009, 25, 12387-12392). More particularly, these non-aqueous conductive phases are composed of DMSO, ethylene glycol, formamide, γ-butyrolactone, N-methylformamide, propylene carbonate, propylene glycol, or 2-pyrrolidone and further comprise a small quantity of large size ions, such as the anionic surfactant sodium dodecyl sulfate (SDS) dissolved therein. In order to avoid the problem of charge injection in the electrowetting process, large size ions are used in low concentration (less than 1 weight % and preferably less than 0.5 weight %) in the non-aqueous conductive phase. Also, the oils described in the papers are dodecane and a polydimethylsiloxane, which are highly insoluble in the polar media. However, these oils and the non-aqueous conductive phases are not density matched and their optical indexes are not suitable for liquid lens applications having the required quality.

Lastly, a paper from X. Hu, S. Zhang, Y. Liu, C. Qu and L. Lu describes non-aqueous conductive phases based on ionic liquids (see Applied Physics Letters 211, 99, 213505). However, non-aqueous conductive phases based on ionic liquids are inadequate because they do not satisfy the requirement of having a freezing point below −20° C. Indeed, ionic liquids are solids at room temperature.

Accordingly, there exists a continuing need to provide highly reliable electrowetting devices.

SUMMARY

An object of the present disclosure is to provide electrowetting devices free of water that ensure a higher reliability compared to devices comprising water-based conductive phases. Also, the electrowetting devices hereby provided have a very high stability with respect to temperature. Simulations have shown that no air bubble occurrence appears before several years or decennia at high temperature. Also, the non-aqueous conductive liquids of the electrowetting devices according to the present disclosure meet all specifications for electrowetting devices (e.g. freezing point lower than −20° C.). Also the non-aqueous conductive liquids and non-conductive liquids of the electrowetting devices hereby provided have a very low cross-solubility. For example, the solubility of the non-conductive liquid in the non-aqueous conductive liquid of electrowetting devices according to the present disclosure may be reduced by 15% or more. Also, the electrowetting devices according to the present disclosure have improved and stable optical performance when exposed to temperatures higher than 25° C.

According to a first aspect, the above-mentioned objects, as well as further advantages, are achieved by an electrowetting optical device comprising: a non-aqueous conductive liquid and a non-conductive liquid, said liquids being non-miscible; and a dielectric enclosure on which both liquids are in contact and form a triple interface, wherein the non-aqueous conductive liquid comprises: a non-ionic polar organic solvent, and at least 2 weight % of a first compound; wherein the first compound is non-aqueous and is ionic or non-ionic; and wherein, if the first compound is non-ionic, the first compound is more polar than the solvent, the polarity of the non-ionic first compound being measured by Hansen parameters, a sum of the Hansen parameter for polarity ($\delta p$) and of the Hansen parameter for hydrogen bonding ($\delta h$) being higher than the sum of the corresponding Hansen parameters of the non-ionic polar organic solvent, and the non-aqueous conductive liquid further comprises an ionic second compound.

According to a second aspect, one or more of the above-mentioned objects may be achieved by a liquid lens comprising the electrowetting optical device according to the first aspect.

According to a third aspect, one or more of the above-mentioned objects may be achieved by an apparatus comprising the liquid lens according to the second aspect.

According to a fourth aspect, one or more of the above-mentioned objects may be achieved by a method for providing an electrowetting optical device, the method comprising: providing a dielectric enclosure; and forming a triple interface by contacting a non-aqueous conductive liquid and a non-conductive liquid to the dielectric enclosure, said liquids being non-miscible, wherein the non-aqueous conductive liquid comprises: a non-ionic polar organic solvent, and at least 2 weight % of a first compound; wherein the first compound is non-aqueous and is ionic or non-ionic; and wherein, if the first compound is non-ionic, the first compound is more polar than the solvent, the polarity of the non-ionic first compound being measured by Hansen parameters, a sum of the Hansen parameter for polarity ($\delta p$) and of the Hansen parameter for hydrogen bonding ($\delta h$) being higher than the sum of the corresponding Hansen parameters of the non-ionic polar organic solvent, and the non-aqueous conductive liquid further comprises an ionic second compound.

According to a fifth aspect, one or more of the above-mentioned objects may be achieved by a use of a non-aqueous conductive liquid as a component of an electrowetting optical device, the non-aqueous conductive liquid comprising: a non-ionic polar organic solvent, and at least 2 weight % of a first compound, wherein the first compound is non-aqueous and is ionic or non-ionic; and wherein, if the first compound is non-ionic, the first compound is more polar than the solvent, the polarity of the non-ionic first compound being measured by Hansen parameters, a sum of the Hansen parameter for polarity ($\delta_p$) and of the Hansen parameter for hydrogen bonding ($\delta_h$) being higher than the sum of the corresponding Hansen parameters of the non-ionic polar organic solvent, and the non-aqueous conductive liquid further comprises an ionic second compound.

Other aspects and advantages of the present disclosure will be apparent from the following description, FIGURE, and appended claims.

DETAILED DESCRIPTION OF EMBODIMENTS

Embodiments of the present disclosure will now be described in detail with reference to the accompanying FIGURE. In the following detailed description of embodiments of the present disclosure, numerous specific details are set forth in order to provide a more thorough understanding of the present disclosure. However, it will be apparent to one of ordinary skill in the art that the present disclosure may be practiced without these specific details. In other instances, well-known features have not been described in detail to avoid unnecessarily complicating the description.

Herein, the words "comprise/comprising" are inclusive or open-ended and do not exclude additional, non-recited elements. Further, herein the term "about" and "substantially" are synonymous with (means the same thing as) a 20% margin, and preferably 10% margin, of the respective value.

In the following, it is meant by "organic compound" a chemical compound consisting mainly of carbon and hydrogen, which may comprise other elements such as oxygen, nitrogen, sulfur and phosphorus, except elemental carbon, carbonates, carbon oxide and carbon cyanide molecules. In the following, it is meant by "inorganic compound" a chemical compound that is not considered "organic". In the following, it is meant by "ionic compound" a chemical compound in which ions are held together by at least one ionic bond. In the following, it is meant by "non-ionic compound" a chemical compound that is not considered "ionic". In the following, it is meant by "oligomer" a compound having 2 to 20 identical (homo-oligomers) or different (co-oligomers) repeating units. In the following, it is meant by "polymer" a compound having more than 20 identical (homo-polymers) or different (co-oligomers/polymers) repeating units. In the following, it is meant by "non-aqueous conductive liquid" the fact that water is not the main constituent (w./w.) of the conductive liquid. In the following, it is meant by "conductive" electrically conductive. In the following, it is meant by "ammonium" a quaternary ammonium cation, i.e. $NR_1R_2R_3R_4^+$ wherein $R_1$, $R_2$, $R_3$, $R_4$ are independently selected from the group comprising H and a linear, cyclic or branched C1-C10 alkyl group. In one or more embodiments, $R_1$, $R_2$, $R_3$, and $R_4$ are each H, the ammonium being $NH_4^+$.

Figure 1:
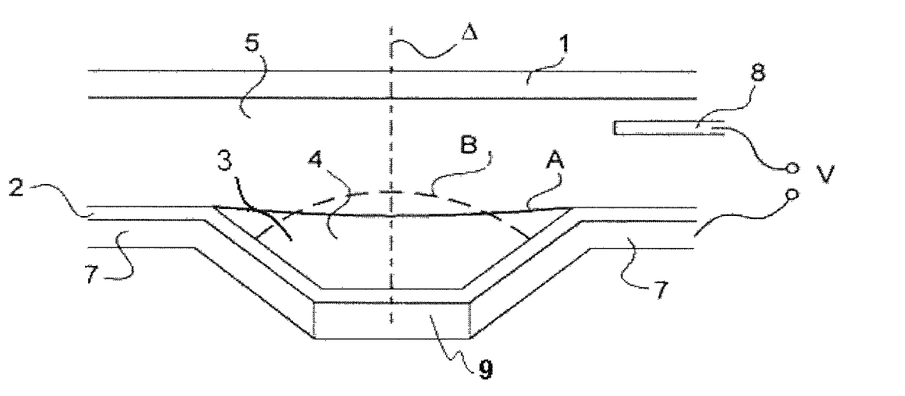
FIG. 1 shows a simplified cross-section view of an exemplary electrowetting optical device according to the present disclosure.

FIG. 1 shows a simplified cross-section view of an exemplary electrowetting optical device according to the present disclosure. An electrowetting optical device may comprise a cell defined by a cell casing comprising an insulating plate 1 (i.e. the higher plate in FIG. 1), side walls (not shown), and a dielectric enclosure (for example in the form of an isolating substrate) 2 which enclose a non-aqueous conductive liquid 5 and a non-conductive liquid 4, the dielectric enclosure 2 having for example a low wettability with respect to the non-aqueous conductive liquid 5 (e.g. hydrophobic). For example, the dielectric enclosure 2 may be non-planar, may comprise a conical or cylindrical depression 3 (i.e. recess, hollow) centered around an axis Δ perpendicular to the plate, and/or may comprise a drop of the non-conductive liquid 4. In FIG. 1, the exemplary depression 3 is a truncated cone. The remainder of the cell may be filled with the non-aqueous conductive liquid 5, non-miscible with the non-conductive liquid 4. For example, the non-conductive liquid and the non-aqueous conductive liquid may have a different refractive index and may have substantially the same density. As shown in this example, the dioptre formed between liquids 4 and 5 forms a surface, the optical axis of which is axis Δ and the other surface of which corresponds to the contact between the drop and the bottom of the hollow. While an electrode 7 such as an annular electrode may be positioned on the external surface of dielectric enclosure, another electrode 8 may be in contact with the non-aqueous conductive liquid 5. In this example, reference numeral 9 indicates a glass or plastic wall. A voltage source (not shown) enables applying an alternative current (i.e. AC) voltage V between electrodes 7 and 8. The dielectric enclosure 2 usually comprises or is made of a transparent material coated with a material that is hydrophobic.

As described in the background section, the development of electrowetting devices remains limited. However, the Applicant has found that non-aqueous conductive liquids according to the present disclosure provide highly reliable electrowetting devices. Indeed, these non-aqueous conductive liquids are not water based and ensure a higher reliability compared to water based conductive phases. Also, the non-aqueous conductive liquids according to the present disclosure have a very high stability with respect to temperature. For example, no air bubble appears before several years or decennia at high temperature. Also, the non-aqueous conductive liquids according to the present disclosure meet the usual specifications for electrowetting devices. For example, not only the non-aqueous conductive liquids of the electrowetting devices according to the present disclosure have a freezing point lower than −20° C. at 1 bar, but also the non-aqueous conductive liquids of the electrowetting devices according to the present disclosure have freezing points clearly lower with respect to any prior art formulations.

According to a first aspect of the present disclosure, an electrowetting optical device may comprise a non-aqueous conductive liquid and a non-conductive liquid, said liquids being non-miscible (in each other), and a dielectric enclosure on which both liquids are in contact and form a triple interface. In one or more embodiments, the non-aqueous conductive liquid and the non-conductive liquid have a different refractive index and/or have substantially the same density.

According to the present disclosure, the non-aqueous conductive liquid may comprise a solvent and at least 2 weight % of a first compound (with respect to the total weight of the non-aqueous conductive liquid; i.e. w./w.). In one or more embodiments, the non-aqueous conductive liquid may comprise at least 51 weight % of the solvent. In one or more embodiments, the non-aqueous conductive liquid may comprise at least 75 weight % of the solvent. In one or more embodiments, the non-aqueous conductive liquid may have a freezing point lower than −20° C. at 1 bar. In one or more embodiments, the non-aqueous conductive liquid may comprise at least 4 weight % of the first compound. In one or more embodiments, the non-aqueous conductive liquid may comprise at least 10 weight % of the first compound. In one or more embodiments, the non-aqueous conductive liquid comprises less than about 5 weight % of water. In one or more embodiments, the non-aqueous conductive liquid comprises less than about 2 weight % of water. In one or more embodiments, the non-aqueous conductive liquid comprises less than about 1 weight % of water. In one or more embodiments, the non-aqueous conductive liquid comprises from 0.01 weight % to 6 weight % of water. In one or more embodiments, the non-aqueous conductive liquid comprises 5 weight % of water or less. In one or more embodiments, the non-aqueous conductive liquid comprises 4 weight % of water or less. In one or more embodiments, the non-aqueous conductive liquid comprises 3 weight % of water or less. According to one or more embodiments, the amount of water in the non-aqueous conductive liquid is sufficient so as to further lower the freezing point of the non-aqueous conductive liquid; and/or the amount of water in the non-aqueous conductive liquid is sufficient so as to not to escape from the dielectric enclosure. According to one or more embodiments, the non-aqueous conductive liquid provides a low and stable relative humidity of 20% or less in the dielectric enclosure. For example, a composition of a water/ethylene glycol mixture with 5 weight % of water is at the equilibrium with a 20% or less relative humidity under atmospheric pressure, even at temperatures ranging from 20° C. to 85° C. Therefore, a non-aqueous conductive liquid comprising a water content as described above is stable in a large range of temperature and provides highly reliable electrowetting optical devices having no air bubble occurrence appearing for several years.

The solvent may be a non-ionic polar organic solvent. For example, the solvent may comprise, and for example consists of, carbon, hydrogen and oxygen atom(s). The solvent may comprise at least 2 carbons and/or at least 2 hydroxyl (—OH) functions. In one or more embodiments, the solvent may comprise 4 carbons or less. In one or more embodiments, the solvent may be a liquid at room temperature and atmospheric pressure (i.e. 1 bar, 20° C.). In one or more embodiments, the solvent may have a boiling point over 120° C. at 1 bar. For example, the solvent may be selected from the group comprising ethane-1,2-diol (i.e. ethylene glycol), propane-1,3-diol (i.e. trimethylene glycol), propane-1,2-diol (i.e. propylene glycol), propane-1,2,3-triol (i.e. glycerol), and any combination thereof. In one or more embodiments, the solvent is ethane-1,2-diol and/or propane-1,3-diol.

The first compound is either ionic or non-ionic and is comprised in the non-aqueous conductive liquid in an amount of at least 2 weight %, for example from 2 weight % to 49 weight %. In one or more embodiments, the first compound may be present in the non-aqueous conductive liquid in an amount of at least 4 weight %. In one or more embodiments, the first compound may be present in the non-aqueous conductive liquid in an amount of at least 10 weight %. In one or more embodiments, the first compound is a compound other than the solvent (i.e. the first compound and the solvent are not the same). In one or more embodiments, the first compound is non-aqueous (i.e. not water). The first compound may be either organic or inorganic. In one or more embodiments, if the first compound is ionic, the non-aqueous conductive liquid may comprise at least 4 weight % of the first compound. In one or more of these embodiments, the first compound may be ionic and organic, such as, for example, a metal carboxylate. In one or more embodiments, if the first compound is non-ionic, the non-aqueous conductive liquid may comprise at least 10 weight % of the first compound. In one or more embodiments, the first compound may have a physical state of a solid or of a liquid at 20° C. and 1 bar of pressure. In one or more embodiments, the first compound may have a boiling point over 120° C. at 1 bar. According to these embodiments, the first compound provides freezing point decrease to the non-aqueous conductive liquid. According to these embodiments, the first compound may also enhance the non-miscibility between the non-conductive liquid and the non-aqueous conductive liquid.

In one or more embodiments, the first compound may be an ionic compound. For example, the first compound may comprise one or more metal or ammonium halide, one or more metal or ammonium carboxylate, one or more metal or ammonium sulfate, one or more metal or ammonium tetrafluoroborate, one or more metal or ammonium carbonate, one or more metal or ammonium nitrate, one or more metal or ammonium methylsulfonate, or any combination thereof. For example, the halide may be selected from the group comprising fluoride, chloride, bromide, iodide, and any combination thereof. In one or more embodiments, the ammonium may be $NH_4^+$. In one or more embodiments, the halide may be selected from the group comprising chloride, bromide, iodide, and any combination thereof. For example, the metal may be selected from the group comprising alkali metals, alkaline earth metals, transition metals, post-transition metals, lanthanides, and any combination thereof. For example, the metal may be selected from the group comprising lithium, sodium, potassium, calcium, zinc, and any combination thereof. For example, the carboxylate may be selected from the group comprising formate, acetate, trifluoroacetate, oxalate, succinate, and any combination thereof. In one or more embodiments, the ionic compound may be selected from the group comprising potassium acetate, sodium acetate, potassium trifluoroacetate, sodium trifluoroacetate, lithium bromide, potassium bromide, sodium bromide, calcium chloride, and any combination thereof. According to these embodiments, the first compound provides a salting out effect as well as an increase in polarity effect of the non-aqueous conductive liquid and further enhances the non-miscibility between the non-conductive liquid and the non-aqueous conductive liquid.

In one or more embodiments, if the first compound is non-ionic, the first compound may be more polar than the solvent, the polarity of the non-ionic first compound being measured by Hansen parameters, the first compound having a sum of Hansen parameter for polarity ($\delta p$) and Hansen parameter for hydrogen bonding ($\delta h$) higher than the sum of the corresponding Hansen parameters of the solvent. Hansen parameters of the first compound and of the solvent may be provided by known tables and methods, such as the method described in Hansen's book: Hansen Solubility Parameters, a user's handbook, Charles M. Hansen, CRC Press 2000, which is hereby incorporated by reference. In one or more embodiments, the first compound may be a non-ionic compound selected from the group comprising glycerol, ethylene glycol, formamide, ethanolamine, lactic acid, triethanolamine, urea, and any combination thereof. In one or more embodiments, the non-ionic compound may comprise glycerol and/or ethylene glycol. According to these embodiments, the first compound provides an increase in polarity of the non-aqueous conductive liquid and further enhances the non-miscibility between the non-conductive liquid and the non-aqueous conductive liquid.

In one or more embodiments, the non-aqueous conductive liquid may comprise at least one ionic compound to ensure improved electric conductivity of the non-aqueous conductive liquid. Accordingly, in one or more embodiments, if the first compound is non-ionic, the non-aqueous conductive liquid may comprise a second compound, the second compound being an ionic compound. For example, the second compound may comprise one or more metal or ammonium halide, one or more metal or ammonium carboxylate, one or more metal or ammonium sulfate, one or more metal or ammonium tetrafluoroborate, one or more metal or ammonium carbonate, one or more metal or ammonium nitrate, one or more metal or ammonium methylsulfonate, or any combination thereof. For example, the halide may be selected from the group comprising fluoride, chloride, bromide, iodide, and any combination thereof. In one or more embodiments, the ammonium may be $NH_4^+$. In one or more embodiments, the halide may be selected from the group comprising chloride, bromide, iodide, and any combination thereof. For example, the metal may be selected from the group comprising alkali metals, alkaline earth metals, transition metals, post-transition metals, lanthanides, and any combination thereof. For example, the metal may be selected from the group comprising lithium, sodium, potassium, calcium, zinc, and any combination thereof. For example, the carboxylate may be selected from the group comprising formate, acetate, trifluoroacetate, oxalate, succinate, and any combination thereof. In one or more embodiments, the second compound may be an organic compound selected from the group comprising potassium acetate, sodium acetate, potassium trifluoroacetate, sodium trifluoroacetate and any combination thereof. In one or more embodiments, the second compound may be an inorganic compound selected from the group comprising calcium chloride, sodium bromide, potassium bromide, lithium bromide and any combination thereof. According to these embodiments, the second compound may provide a salting out effect of the non-aqueous conductive liquid and further enhances the non-miscibility between the non-conductive liquid and the non-aqueous conductive liquid. For example, the salting-out effect may be dependent on the second compound concentration.

In one or more embodiments, the non-aqueous conductive liquid may comprise the ionic second compound in an amount of about 10 weight % or less. In one or more embodiments, the non-aqueous conductive liquid may comprise the ionic second compound in an amount of about 5 weight % or less, such as for example from 2 weight % to 5 weight %. In one or more embodiments, the non-aqueous conductive liquid may comprise the ionic second compound in an amount of about 2 weight % or less, and for example about 0.5 weight % or less.

In one or more embodiments, the non-aqueous conductive liquid according to the present disclosure may be highly polar as it comprises a non-ionic polar organic solvent. In addition, the non-aqueous conductive liquid according to the present disclosure may comprise at least 2 weight % of an ionic compound, for example when the first compound is ionic, and for example when non-aqueous conductive liquid comprises from 2 weight % to 5 weight % of the ionic second compound. As a result, a unique salting-out effect is achieved, which allows to reduce or minimize the cross-solubility between the non-aqueous conductive liquid and the non-conductive liquid. For example, adding from 2 weight % to about 5 weight % of an ionic first or second compound, such as a potassium, sodium or ammonium salt of nitrate, trifluoroacetate, acetate or carbonate, may reduce the solubility of the non-conductive liquid in the non-aqueous conductive liquid by 15% or more. Furthermore, the reduced or minimized cross-solubility between the non-aqueous conductive liquid and the non-conductive liquid provides electrowetting devices with highly stable optical performances, even when exposed to higher temperatures, such as temperature higher than 25° C.

In one or more embodiments, the non-aqueous conductive liquid may comprise at least one further/additional compound, i.e. a third compound other than the solvent, the first compound and the second compound. In one or more embodiments, the additional compound may be non-aqueous (i.e. not water). For example, the at least one additional compound may be either inorganic or organic, and either ionic or non-ionic. In one or more embodiments, said additional compound may have a boiling point over 120° C. at 1 bar. For example, the at least one additional compound may be selected from the group comprising dimethylsulfoxide, propylene carbonate, ethyl lactate, γ-butyrolactone, trifluoroethanol, glycerin carbonate, 3-hydroxypropionitrile, methyl glycolate, N-methyl pyrrolidone, and any combination thereof. According to these embodiments, the additional compound may provide improved density, optical index, viscosity and polarity of the conductive phase.

The non-conductive liquid may comprise a Si-based monomer, oligomer, and/or polymer, a Ge-based monomer, oligomer and/or polymer, a Si—Ge-based monomer, oligomer and/or polymer, a hydrocarbon, or any combination thereof as described in patent EP 1 816 491 A1, which is hereby incorporated by reference.

The hydrocarbon may be cyclic, linear or branched. The hydrocarbon may be saturated or unsaturated. The hydrocarbon may be aromatic or non-aromatic. For example, the hydrocarbon may have from 6 to 20 carbon atoms. The hydrocarbon may further comprise one or more heteroatoms, as substituants and/or as atoms or groups of atoms interrupting the hydrocarbon chain and/or ring. Such heteroatoms comprise, but are not limited to oxygen, sulfur, nitrogen, phosphor, halogens (mainly as fluorine, chlorine, bromine and/or iodine).

The non-conductive liquid may comprise one or several of the following silicon-based compound:
a siloxane of the formula 1a, 1b or 1c:

wherein each of R1, R2 and R' independently represents alkyl, (hetero)aryl, (hetero)arylalkyl, (hetero)arylalkenyl or (hetero)arylalkynyl and n is comprised between about 1 and about 20, such as for example between about 1 and about 10 (in one or more embodiments, n may be 1, 2, 3, 4 or 5 and with the precision that n is greater than 2 in formula 1c);
a silane of formula 2:

wherein R1, R2 and R' are as defined above and m is comprised between about 1 and about 20, such as for example between about 1 and about 10 (in one or more embodiments, m may be 1, 2 or 3);
a monosilane of formula 3:

wherein R1 and R2 are as defined above, and each of R3 and R4 independently represents alkyl, (hetero)aryl, (hetero)arylalkyl, (hetero)arylalkenyl or (hetero)arylalkynyl.

In one or more embodiments, in the above formulae 1a, 1b and 2, all R' may be identical or different. For example, R' may be methyl or halogenated alkyls. In one or more embodiment, in the above formulae 1a, 1b and 2, all R' are the same. In one or more embodiment, each R' may be methyl. For example, the non-conductive liquid may comprise one or several of the following specific silicon-based species: hexamethyldisilane, hexaethyldisilane, diphenyldimethylsilane, chlorophenyltrimethylsilane, phenyltrimethylsilane, phenethyltris(trimethylsiloxy)silane, phenyltris(trimethylsiloxy)silane, polydimethylsiloxane, tetraphenyltetramethyltrisiloxane, poly(3,3,3-trifluoropropylmethylsiloxane), 3,5,7-triphenylnonamethylpentasiloxane, 3,5-diphenyloctamethyltetrasiloxane, 1,1,5,5-tetraphenyl-1,3,3,5-tetramethyltrisiloxane, and hexamethylcyclotrisiloxane. In one or more embodiment, non-conductive liquid may comprise one or several of the following specific silicon-based species: hexamethyldisilane, hexaethyldisilane, diphenyldimethylsilane, phenyltris(trimethylsiloxy)silane and polydimethylsiloxane such as DMS-T12 from Gelest®, which is trimethylsiloxy terminated polydimethylsiloxane. In one or more embodiment, the non-conductive liquid may comprise hexamethyldisilane and/or hexaethyldisilane. According to these embodiments, aliphatic silanes like hexamethyldisilane and hexaethyldisilane may provide a low solubility of the insulating fluid in the non-aqueous conductive phase.

The non-conductive liquid may comprise one or several of the following germane based species:—a germanoxane of formula 4,—a germane of formula 5,—a germane of formula 6:

wherein R', R1, R2, R3, R4 and n are as defined above.

The non-conductive liquid may comprise one or several of the following specific germane based species: hexamethyldigermane, hexaethyldigermane, diphenyldimethylgermane, phenyltrimethylgermane. In one or more embodiment, the non-conductive liquid may comprise hexamethyldigermane and/or hexaethyldigermane. According to these embodiments, the use of a germane according to the present disclosure, such as hexamethyldigermane and hexaethyldigermane, may provide a non-conductive liquid having a density particularly adapted to the density of the non-aqueous conductive liquids according to the present disclosure. According to another feature, hexamethyldigermane and hexaethyldigermane may provide a low solubility of the insulating fluid in the non-aqueous conductive phase. According to another feature, Ge-based compounds may be used as wetting agents as they exhibit adequate wetting properties for optical electrowetting devices.

In one or more embodiments of the present disclosure, the dielectric enclosure may comprise a compound selected from the group comprising poly-para-xylylene linear polymers, polydimethylsiloxanes, SiOC, SiN$_3$, Al$_2$O$_3$, SiO$_2$, and any combination thereof. For example, the dielectric enclosure may comprise substituted or non-substituted poly-para-xylylene polymers. In one or more embodiment, the dielectric enclosure may comprise parylene C (poly-chloro-para-xylylene). In one or more embodiment, the dielectric enclosure may comprise fluorinated poly-para-xylylene. In one or more embodiment, the dielectric enclosure may be coated with a thin layer of a low surface energy coating such as Teflon®, Cytop®, Fluoropel®, SiOC. In one or more embodiment, the dielectric enclosure may be coated with SiOC or Cytop®. The deposition of the SiOC material is described in patent WO2008/110560 A1, which is hereby incorporated by reference. In one or more embodiments, the dielectric enclosure may comprise poly-para-xylylene linear polymers and be coated with a layer of a low surface energy coating.

A second aspect of the present disclosure is to provide a liquid lens, such for example a variable focus liquid lens, an optical diaphragm, an optical zoom, an ophthalmic device, comprising an electrowetting optical device according to the present disclosure or an electrowetting optical device provided by the method according to the present disclosure.

A third aspect of the present disclosure is to provide an apparatus, such as for example a camera, a cell phone, a telemeter, an endoscope, a dental video camera and the like, comprising the liquid lens according to the second aspect.

A fourth aspect of the present disclosure is to provide a method for providing/manufacturing an electrowetting optical device according to the present disclosure. The method comprises providing a dielectric enclosure, and forming a triple interface by contacting a non-aqueous conductive liquid and a non-conductive liquid according to the present disclosure to the dielectric enclosure, said liquids being non-miscible.

A fifth aspect of the present disclosure is to provide a use of a non-aqueous conductive liquid according to the present disclosure as a component of an electrowetting optical device.

EXAMPLES

Several formulations of non-aqueous conductive liquids and non-conductive liquids according to the present disclosure are provided below.

Formulations 1
Non-Conductive Liquid

| phenyltrimethylgermane | 62.50 w. % |
| diphenyldimethylgermane | 27.5 w. % |
| diphenyldimethylsilane | 10.00 w. % |

Non-Aqueous Conductive Liquid

| potassium acetate | 04.20 w. % |
| ethylene glycol | 95.80 w. % | or:

| sodium bromide | 02.00 w. % |
| ethylene glycol | 98.00 w. % |

Formulations 2
Non-Conductive Liquid

| hexaethyldigermane | 56.00 w. % |
| diphenyldimethylgermane | 37.00 w. % |
| phenyltris(trimethylsiloxy)silane | 07.00 w. % |

Non-Aqueous Conductive Liquid

| potassium acetate | 04.20 w. % |
| ethylene glycol | 95.80 w. % | or:

| sodium bromide | 02.00 w. % |
| ethylene glycol | 98.00 w. % |

Formulations 3
Non-Conductive Liquid

| hexamethyldigermane | 47.00 w. % |
| hexaethyldigermane | 30.00 w. % |
| hexamethyldisilane | 03.00 w. % |
| diphenyldimethylgermane | 20.00 w. % | or:

| hexamethyldigermane | 36.00 w. % |
| hexaethyldigermane | 62.00 w. % |
| hexamethyldisilane | 02.00 w. % |

Non-Aqueous Conductive Liquid

| potassium acetate | 00.10 w. % |
| ethylene glycol | 79.90 w. % |
| glycerol | 20.00 w. % |

Formulation 4
Non-Conductive Liquid

| hexamethyldigermane | 41.00 w. % |
| hexaethyldigermane | 55.00 w. % |
| hexamethyldisilane | 4.00 w. % |

Non-Aqueous Conductive Liquid

| potassium acetate | 00.10 w. % |
| ethylene glycol | 89.90 w. % |
| glycerol | 10.00 w. % |

Formulation 5
Non-Conductive Liquid

| hexamethyldigermane | 30.00 w.% |
| hexaethyldigermane | 60.00 w.% |
| hexamethyldisilane | 5.00 w.% |
| diphenyldimethylgermane | 5.00 w.% |

Non-Aqueous Conductive Liquid

| | |
|---|---|
| potassium acetate | 00.10 w.% |
| ethylene glycol | 79.90 w. % |
| triethanolamine | 20.00 w. % |

Formulation 6
Non-Conductive Liquid

| | |
|---|---|
| phenyltrimethylgermane | 75.00 w. % |
| DMS-T12 (polydimethylsiloxane) | 25.00 w. % |

Non-Aqueous Conductive Liquid

| | |
|---|---|
| calcium chloride | 00.01 w.% |
| trimethylene glycol | 85.99 w. % |
| ethylene glycol | 14.00 w. % |

The durability of optical electrowetting devices according to formulations 1 to 6 has been extensively tested. For example, lenses comprising formulations 1 and 6 have shown durability higher than one year when stored at 85° C. Conversely, reference lenses comprising aqueous conductive phases, such as the ones designed according to patent EP 1 816 491 A1, failed in 2.5 months when stored at 85° C.

Although the above-mentioned examples have been described in detail, it is understood that alternative embodiments of the disclosure can be envisaged. Thus, for example, conductive liquids comprising a solvent other than ethylene glycol or 3-hydroxypropan-1-ol may be used to provide an electrowetting device according to the present disclosure. In addition, various compositions with respect to the first compound and the second compound may be envisaged to obtain an electrowetting device according to the present disclosure. So for example, a first compound, which is other than potassium acetate, sodium bromide, ethylene glycol or glycerol, may be envisaged to provide an electrowetting device according to the present disclosure. Also, a second compound, which is other than potassium acetate or calcium chloride, may be envisaged to provide an electrowetting device according to the present disclosure.

The invention claimed is:

1. An electrowetting optical device comprising:
a non-aqueous conductive liquid and a non-conductive liquid, said liquids being non-miscible; and
a dielectric enclosure on which both liquids are in contact and form a triple interface,
wherein
the non-aqueous conductive liquid comprises:
a non-ionic polar organic solvent, and
at least 2 weight % of a first compound;
wherein
the first compound is non-aqueous and is ionic or non-ionic;
wherein, if the first compound is non-ionic,
the first compound is more polar than the solvent, the polarity of the non-ionic first compound being measured by Hansen parameters, a sum of the Hansen parameter for polarity ($\delta_p$) and of the Hansen parameter for hydrogen bonding ($\delta_h$) being higher than the sum of the corresponding Hansen parameters of the non-ionic polar organic solvent, and
the non-aqueous conductive liquid further comprises an ionic second compound, and
wherein, if the first compound is ionic,
the non-aqueous conductive liquid further comprises from 0.01 weight % to 6 weight % of water.

2. The electrowetting optical device according to claim 1, wherein the non-aqueous conductive liquid comprises less than 5 weight % of water.

3. The electrowetting optical device according to claim 1, wherein the non-aqueous conductive liquid comprises less than 5 weight % of the ionic second compound.

4. The electrowetting optical device according to claim 1, wherein the non-aqueous conductive liquid has a freezing point lower than −20° C. at 1 bar.

5. The electrowetting optical device according to claim 1, wherein the solvent comprises at least two hydroxyl functions.

6. The electrowetting optical device according to claim 1, wherein the solvent has a boiling point over 120° C. at 1 bar.

7. The electrowetting optical device according to claim 1, wherein the solvent is selected from the group comprising ethane-1,2-diol, propane-1,3-diol, propane-1,2-diol, and propane-1,2,3-triol, and any combination thereof.

8. The electrowetting optical device according to claim 1, wherein the first compound has a boiling point over 120° C. at 1 bar.

9. The electrowetting optical device according to claim 1, wherein any further compound comprised in the non-aqueous conductive liquid has a boiling point over 120° C. at 1 bar.

10. A liquid lens comprising the electrowetting optical device according to claim 1.

11. An apparatus comprising the liquid lens according to claim 10.

12. A method for providing an electrowetting optical device, the method comprising:
providing a dielectric enclosure; and
forming a triple interface by contacting a non-aqueous conductive liquid and a non-conductive liquid on the dielectric enclosure, said liquids being non-miscible,
wherein
the non-aqueous conductive liquid comprises:
a non-ionic polar organic solvent, and
at least 2 weight % of a first compound;
wherein
the first compound is non-aqueous and is ionic or non-ionic;
wherein, if the first compound is non-ionic,
the first compound is more polar than the solvent, the polarity of the non-ionic first compound being measured by Hansen parameters, a sum of the Hansen parameter for polarity ($\delta_p$) and of the Hansen parameter for hydrogen bonding ($\delta_h$) being higher than the sum of the corresponding Hansen parameters of the non-ionic polar organic solvent, and
the non-aqueous conductive liquid further comprises an ionic second compound, and
wherein, if the first compound is ionic,
the non-aqueous conductive liquid further comprises from 0.01 weight % to 6 weight % of water.

13. Use of a non-aqueous conductive liquid as a component of an electrowetting optical device, the non-aqueous conductive liquid comprising:
a non-ionic polar organic solvent, and
at least 2 weight % of a first compound, wherein
   the first compound is non-aqueous and is ionic or non-ionic;
wherein, if the first compound is non-ionic,
   the first compound is more polar than the solvent, the polarity of the non-ionic first compound being measured by Hansen parameters, a sum of the Hansen parameter for polarity ($\delta_p$) and of the Hansen parameter for hydrogen bonding ($\delta_h$) being higher than the sum of the corresponding Hansen parameters of the non-ionic polar organic solvent, and
   the non-aqueous conductive liquid further comprises an ionic second compound, and
if the first compound is ionic,
   the non-aqueous conductive liquid further comprises from 0.01 weight % to 6 weight % of water.

14. The electrowetting optical device according to claim 1, wherein if the first compound is ionic, the non-aqueous conductive liquid comprises from 1 weight % to 6 weight % of water.

\* \* \* \* \*

UNITED STATES PATENT AND TRADEMARK OFFICE
CERTIFICATE OF CORRECTION

PATENT NO. : 9,939,630 B2  
APPLICATION NO. : 14/717042  
DATED : April 10, 2018  
INVENTOR(S) : Benjamin Burger et al.

Page 1 of 1

It is certified that error appears in the above-identified patent and that said Letters Patent is hereby corrected as shown below:

On the Title Page

In Column 1, item (72), Inventors, Line 1, delete "Lyons" and insert -- Lyon --, therefor.

In Column 1, item (72), Inventors, Line 2, delete "Lyons" and insert -- Lyon --, therefor.

Signed and Sealed this
Twenty-seventh Day of August, 2024

Katherine Kelly Vidal
*Director of the United States Patent and Trademark Office*